3,162,625
NOVEL INITIATORS FOR N-VINYL AMIDE
POLYMERIZATION
Benjamin Joseph Luberoff, Monsey, N.Y., and William
D. Gersumky, Stamford, Conn., assignors to American
Cyanamid Company, New York, N.Y., a corporation
of Maine
No Drawing. Filed Jan. 5, 1961, Ser. No. 80,739
12 Claims. (Cl. 260—88.3)

This invention relates to certain new and useful improvements in a method for the polymerization of N-vinyl amides. More particularly, it is concerned with the method of polymerizing cyclic N-vinyl amides, utilizing various heavy metal salts as catalysts therefor. These cyclic N-vinyl amides may be represented by the following general formula:

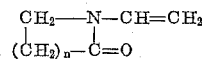

wherein $n$ is an integer of from 2 to 4 inclusive. Compounds which are represented by the above mentioned formula include N-vinyl pyrrolidone on N-vinyl butyrolactam, N-vinyl valerolactam and N-vinyl-ε-caprolactam.

The polymerizable material may be a single compound or a plurality of various lactams.

The polymerization of N-vinyl amides particularly N-vinyl lactams, such as N-vinyl pyrrolidone, has generally been effected by peroxides or other free radical catalysts. These reactions are described in a book by J. W. Copenhauer et al., "Acetylene and Carbon Monoxide Chemistry," Reinhold Corp., New York, N.Y. 1949, page 67 and following. Similar, polymerizations of N-vinyl amides using other types of catalysts have also been reported by C. E. Schildknecht et al., Industrial and Engineering Chemistry 41, page 2896 (1949). In this instance, boron fluoride etherate was employed as the catalyst.

The peroxide or free radical catalysts, mentioned above, while excellent for the polymerization of other materials are not as advantageous for the polymerization of the cyclic N-vinyl amides of the instant invention for numerous reasons. Primarily, no polymerization takes place using these peroxide catalysts at convenient temperatures, i.e., about 0–100° C. A polymer is produced at higher temperatures but this polymer is a highly soluble popcorn type polymer which is not as useful and easy to work with as the polymers produced using the catalyst of the instant invention, which can be produced at tempertures within the range set forth above. Furthermore, peroxide catalysts such as benzoyl peroxide are not stable at temperatures significantly above 100° C. and therefore they can be used only above about 100° C. since these catalysts function by decomposing.

The acidic catalysts, which are very often used for initiating the polymerization, are inferior to the catalysts of the instant invention because they require a very low temperature when used for the polymerization of cyclic N-vinyl amides. The requirement of a low temperature necessitates the use of extra cooling equipment and causes the whole process to be complex, costly and rather difficult to control and carry out. Therefore, it can be seen that the instant heavy metal salt catalysts, when used to polymerize cyclic N-vinyl amides, result in the most desired type of polymer and are effective at temperatures which require no expensive and burdensome equipment. In addition to the shortcomings of the prior art catalysts mentioned above, i.e., peroxide and acid catalysts, the boron fluoride etherate and similar Friedel-Crafts catalysts ($AlCl_3$, $AlBr_3$, $TiCl_4$ and $SnCl_4$) are very hydroscopic and are therefore difficult to handle. The salts of the instant invention do not belong to this class of Friedel-Crafts type catalysts.

We have found that they are able to polymerize the aforesaid N-vinyl amides at room temperature, although temperatures as low as 0° C. and as high as 100° C. may be used. These amides are polymerized through the use of various heavy metal salts. The compuonds encompassed by this classification include mercuric chloride, mercuric iodide, mercuric bromide, bismuth trichloride, bismuth triiodide, bismuth tribromide, antimony trichloride, mercuric sulfate, and mercuric nitrate. The amount of catalyst employed is not critical, but generally 0.1 to 5.0 weight percent based on the polymerizable monomer is preferred. As mentioned above, the compounds do not belong to the class of compounds defined as Friedel-Crafts catalysts and are certainly not considered peroxide or even broadly free radical initiating catalysts. P. J. Flory ("Principle of Polymer Chemistry," Cornell University Press, Ithaca, N.Y., 1953, page 217), clearly teaches that the above mentioned heavy material salts of the instant invention do not belong to the class of compounds defined as Friedel-Crafts catalysts.

The usefulness of these compounds, that is, the heavy metal salts used in the instant invention, as catalysts in the polymerization of cyclic N-vinyl amides, is surprising and unexpected since they are considered to be less prone to promote vinyl polymerization than the peroxide or Friedel-Crafts catalysts, and what is more striking is that they fail to initiate the polymerization of styrene, para-methyl styrene, alpha-p-dimethyl styrene, acrylonitrile, acrylic acid, butylacrylate, triallyl cyanurate, n-octyl vinyl sulfone, n-octyl vinyl sulfide or vinyl acetate. These compounds are well-known members of the class of compounds which are readily polymerized by Friedel-Crafts catalytic agents. Furthermore, it has been shown that the mercuric chloride initiated polymer, isolated from a mixture of N-vinyl pyrrolidone and para-methyl styrene, contains only a small amount of the styrene. We cannot explain this selectivity in polymerization of the N-vinyl amides over a styrene compound especially since styrenes in general undergo vinyl polymerization more easily than most vinyl monomers.

The present invention is carried out either in bulk or in the presence of inert organic solvents such as acetone, dioxane, the dimethyl ether of ethylene glycol, the dimethyl ether of diethylene glycol, tetrahydrofuran, methanol and lower alcohols, and the like. The heavy metal salt is simply added in amounts varying over a wide range of proportions to the vinyl monomer or a solution of the vinyl monomer or the catalyst is added to the solvent before addition of the vinyl monomer. An exotherm follows and sometimes necessitates cooling of the reaction medium to maintain control over the polymerization. The reaction usually is complete in less than five to ten minutes and the polymer may be easily isolated in the usual way. The polymers formed are viscous syrups to softy solids, soluble or dispersible in water and lower alcohols; insoluble in hydrocarbons and can be freed of monomers and catalyst by washing with cold benzene and acetone. The physical state of the resulting polymer is governed by the nature of the monomer, the temperature of the reaction, the amount and type of catalyst and the time of contacting the monomer with the catalyst. Generally, the higher the temperature, the harder the polymer and low temperatures result in a viscous syrupy product. The same is true regarding the duration of contact. The longer the contact time the harder the polymer. Contacting a short time will produce a syrupy polymer.

In order that those skilled in the art may better understand how the present invention may be carried into effect, the following examples are given by way of illustration and not by way of limitation. All parts and percentages are by weight unless otherwise stated.

Example 1

To 100 parts of N-vinyl pyrrolidone, 5 parts of mercuric chloride is added at room temperature. A rapid exothermic reaction occurs. The reaction is easily controled by cooling the reaction vessel. Benzene is added and a water white polymer of polymerized N-vinyl pyrrolidone precipitates. The solution is filtered and poly N-vinyl pyrrolidone is recovered.

Example 2

Same as Example 1 except that N-vinyl-ε-caprolactam is the monomer treated. A white powder of polymerized N-vinyl-ε-caprolactam is recovered after precipitation, filtration, and washing.

Example 3

Same as Example 1 only mercuric bromide is substituted for the mercuric chloride. A stiff polymer of N-vinyl pyrrolidone is produced.

Example 4

Same as Example 1, but mercuric nitrate is the catalyst utilized. Again, a white polymer of N-vinyl pyrrolidone results.

Example 5

Same as Example 1, but mercuric iodide is used as the catalyst. The same type of water white polymer of N-vinyl pyrrolidone is again recovered.

Example 6

Same as Example 1, except that mercuric sulfate is substituted for the mercuric chloride. A polymer of N-vinyl pyrrolidone results.

Example 7

Same as Example 1, but antimony trichloride is used as the catalyst. The polymerized product recovered again is identified as poly N-vinyl pyrrolidone.

Example 8

One percent by weight of bismuth trichloride is mixed with N-vinyl pyrrolidone. An exothermic reaction results and the reaction mixture is quickly cooled to 40°–70° C. After precipitation with an inert hydrocarbon material and filtration, a white polymer of N-vinyl pyrrolidone is recovered.

Example 9

Same as Example 8 except that bismuth tribromide is used as the catalyst as a substitute for the bismuth trichloride. A stiff polymer of N-vinyl pyrrolidone is recovered.

Example 10

Same as Example 8, except that bismuth triiodide is the catalyst utilized. The polymer of N-vinyl pyrrolidone recovered is again a white powder.

The polymers produced in the instant invention are more or less viscous depending on the reaction conditions, that is, temperature, catalyst, and the like. The different physical properties of these polymers can be controlled so that a variety of utilities are found therefor. By their very nature, they are used as thickening agents and viscosity controllers. In addition, they are advantageously employed in pharmaceutical and cosmetic preparations as vehicles or other active ingredients. The monomeric N-vinyl amides can be prepared from amides carrying a β-substituted ethyl radical, namely

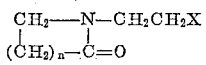

wherein X is halogen, OH, OOCR and the like and $n$ is a positive whole number from 2–4. The monomeric N-vinyl amides may also be prepared by reacting a lactam and acetylene in the presence of a strong base as catalyst and under pressure.

We claim:

1. A method of homopolymerizing cyclic N-vinyl amides having the following formula

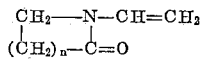

wherein $n$ is an integer of from 2 to 4 inclusive which comprises contacting said amide with a catalyst selected from the class of compounds consisting of mercuric chloride, mercuric iodide, mercuric bromide, bismuth trichloride, bismuth triiodide, bismuth tribromide, antimony trichloride, mercuric nitrate, and mercuric sulfate and at a temperature of from about 0 to 100° C.

2. A method of homopolymerizing N-vinyl pyrrolidone which comprises contacting said N-vinyl pyrrolidone with a catalyst selected from the class of compounds consisting of mercuric chloride, mercuric iodide, mercuric bromide, bismuth trichloride, bismuth triiodide, bismuth tribromide, antimony trichloride, mercuric nitrate and mercuric sulfate and at a temperature of from about 0 to 100° C.

3. A method of homopolymerizing N-vinyl valerolactam which comprises contacting said N-vinyl valerolactam with a catalylst selected from the class of compounds consisting of mercuric chloride, mercuric iodide, mercuric bromide, bismuth trichloride, bismuth triiodide, bismuth tribromide, antimony trichloride, mercuric nitrate and mercuric sulfate and at a temperature of from about 0 to 100° C.

4. A method of homopolymerizing N-vinyl-ε-caprolactam which comprises contacting said N-vinyl-ε-caprolactam with a catalyst selected from the class of compounds consisting of mercuric chloride, mercuric iodide, mercuric bromide, bismuth trichloride, bismuth triiodide, bismuth tribromide, antimony trichloride, mercuric nitrate and mercuric sulfate and at a temperature of from about 0 to 100° C.

5. A method of homopolymerizing cyclic-N-vinyl amides having the following general formula

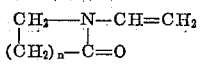

wherein $n$ is an integer from 2 to 4 inclusive which comprises contacting said amide with a catalyst comprising mercuric chloride and at a temperature of from about 0 to 100° C.

6. A method of homopolymerizing cyclic-N-vinyl amides having the general formula

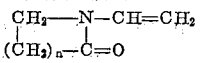

whenin $n$ is an integer from 2 to 4 inclusive which comprises contacting said amide with a catalyst comprising bismuth chloride and at a temperature of from about 0 to 100° C.

7. A method of homopolymerizing cyclic-N-vinyl amides having the following general formula

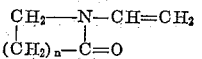

wherein $n$ is an integer from 2 to 4 inclusive which comprises contacting said amide with a catalyst comprising mercuric nitrate and at a temperature of from about 0 to 100° C.

8. A method of homopolymerizing cylic-N-vinyl amides having the general formula

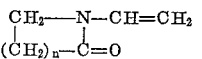

wherein $n$ is an integer from 2 to 4 inclusive which comprises contacting said amide with a catalyst comprising mercuric sulfate and at a temperature of from about 0 to 100° C.

9. A method of homopolymerizing cyclic-N-vinyl amides having the following general formula $$\begin{array}{c} CH_2\text{---}N\text{---}CH=CH_2 \\ | \quad\quad\quad | \\ (CH_2)_n\text{---}C=O \end{array}$$

wherein $n$ is an integer from 2 to 4 inclusive which comprises contacting said amide with a catalyst comprising antimony trichloride.

10. A method of homopolymerizing N-vinyl pyrrolidone which comprises contacting said N-vinyl pyrrolidone with a catalyst comprising mercuric chloride and at a temperature of from about 0 to 100° C.

11. A method of homopolymerizing N-vinyl pyrrolidone which comprises contacting said N-vinyl pyrrolidone with a catalyst comprising bismuth trichloride.

12. A method of homopolymerizing N-vinyl pyrrolidone which comprises contacting said N-vinyl pyrrolidone with a catalyst comprising antimony trichloride.

References Cited in the file of this patent
UNITED STATES PATENTS 2,846,427    Findlay _____ Aug. 5, 1958

OTHER REFERENCES

Schildknecht et al., Industrial and Engineering Chemistry, volume 41, page 2896 (1949).

Calloway, Chemical Reviews, volume 17, pages 327–392 (1935).